(12) United States Patent
Hong et al.

(10) Patent No.: US 12,298,713 B2
(45) Date of Patent: May 13, 2025

(54) HOLOGRAM PRINTING METHOD AND APPARATUS USING MASK

(71) Applicant: Korea Electronics Technology Institute, Seongnam-si (KR)

(72) Inventors: Sung Hee Hong, Seoul (KR); Young Min Kim, Seoul (KR); Ji Soo Hong, Seoul (KR); Jin Soo Jeong, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 545 days.

(21) Appl. No.: 17/622,952

(22) PCT Filed: Dec. 2, 2020

(86) PCT No.: PCT/KR2020/017423
§ 371 (c)(1),
(2) Date: Dec. 27, 2021

(87) PCT Pub. No.: WO2022/118995
PCT Pub. Date: Jun. 9, 2022

(65) Prior Publication Data
US 2023/0047713 A1    Feb. 16, 2023

(30) Foreign Application Priority Data

Dec. 2, 2020    (KR) .................. 10-2020-0166170

(51) Int. Cl.
*G03H 1/04* (2006.01)
*G03H 1/02* (2006.01)
*G03H 1/12* (2006.01)

(52) U.S. Cl.
CPC ............ *G03H 1/0476* (2013.01); *G03H 1/02* (2013.01); *G03H 1/12* (2013.01);
(Continued)

(58) Field of Classification Search
CPC .......... G03H 1/0476; G03H 1/02; G03H 1/12; G03H 1/04; G03H 1/0486;
(Continued)

(56) References Cited

U.S. PATENT DOCUMENTS 9,367,036 B2 *   6/2016   Pyun ................. G03H 1/30
2014/0055830 A1 * 2/2014  Pyun ................. G03H 1/0486
                                              359/30
(Continued)

FOREIGN PATENT DOCUMENTS

JP    2006-259271 A    9/2006
JP    2006-338851 A    12/2006
(Continued)

OTHER PUBLICATIONS

Hong et al (Resolution enhancement of holographic printer using a hogel overlapping method, Optics Express, vol. 21, No. 12, pp. 14047-14053, Jun. 5, 2013) (Year: 2013).*

(Continued)

*Primary Examiner* — Jyotsna V Dabbi
(74) *Attorney, Agent, or Firm* — NSIP Law

(57) ABSTRACT

A method and an apparatus for printing a hologram by using a mask are provided. A method generates a hologram fringe pattern, splits the hologram fringe pattern on a hogel basis, generates the split hogels, masks a part of the generated hogel, and prints the masked hogel on a hologram medium. Accordingly, an empty space which occurs between hogels when a hologram is printed is prevented from being generated by using a mask, so that a fill factor can be effectively enhanced, and eventually, image quality of a hologram can be enhanced.

11 Claims, 6 Drawing Sheets

(52) U.S. Cl.
CPC ............... *G03H 2001/0224* (2013.01); *G03H 2001/0292* (2013.01); *G03H 2223/53* (2013.01)

(58) Field of Classification Search
CPC ... G03H 2001/0224; G03H 2001/0292; G03H 2001/048; G03H 2001/0482; G03H 2001/0439; G03H 2223/53; G03H 2223/12; G03H 2225/30
USPC .............................................................. 359/1
See application file for complete search history.

(56) References Cited

U.S. PATENT DOCUMENTS

| | | |
|---|---|---|
| 2014/0285863 A1 | 9/2014 | Pyun et al. |
| 2021/0191318 A1* | 6/2021 | Kick ........................ G03H 1/26 |
| 2023/0417962 A1* | 12/2023 | Lee ........................ G02B 27/286 |

FOREIGN PATENT DOCUMENTS

| | | | |
|---|---|---|---|
| KR | 20130129057 A * | 11/2013 | ............... G03H 1/04 |
| KR | 10-2014-0115168 A | 9/2014 | |
| WO | WO-2023047145 A1 * | 3/2023 | |

OTHER PUBLICATIONS

Korean Office Action issued on Jun. 20, 2023, in corresponding Korean Patent Application No. 10-2020-0166170 (2 pages in English, 4 pages in Korean).

Korean Office Action issued on Mar. 26, 2024, in counterpart Korean Patent Application No. 10-2020-0166170 (2 pages in English, 4 pages in Korean).

* cited by examiner

HOLOGRAM PRINTING METHOD AND APPARATUS USING MASK

CROSS REFERENCE TO RELATED APPLICATIONS

This application is a U.S. National Stage Application of International Application No. PCT/KR2020/017423, filed on Dec. 2, 2020, which claims the benefit under 35 USC 119(a) and 365(b) of Korean Patent Application No. 10-2020-0166170, filed on Dec. 2, 2020, in the Korean Intellectual Property Office, the entire disclosure of which is incorporated herein by reference for all purposes.

TECHNICAL FIELD

The present disclosure relates to hologram-related technology, and more particularly, to a method and an apparatus for printing a hologram, which print a hologram on a hologram medium on a holographic element (hogel) basis.

BACKGROUND ART

A printing method of a hologram printer is a method for printing an entire fringe pattern by calculating the entire fringe pattern and then splitting on a hogel basis, and printing at respective points by using a stage.

In this case, an empty space (see FIG. 1) may occur between hogels due to software, hardware problems, and in practice, many empty spaces may occur.

A hardware problem that causes occurrence of an empty space is that there is still an empty space even if hogels are shot without an empty space since reference beams are Gaussian beams and thus ambient light is lost.

This causes a problem of noticeably degrading a fill factor of HOE, and accordingly, there is a demand for solving this problem.

DISCLOSURE

Technical Problem

The present disclosure has been developed in order to address the above-discussed deficiencies of the prior art, and an object of the present disclosure is to provide a method and an apparatus for printing a hologram by using a mask, as a solution for reducing an empty space between hogels, which occurs in a related-art printing method, in order to generate a hologram of good quality.

Technical Solution

According to an embodiment of the present disclosure to achieve the above-described object, a hologram printing method includes the steps of: generating a hologram fringe pattern; splitting the hologram fringe pattern on a hogel basis; generating the split hogels; masking a part of the generated hogel; and printing the masked hogel on a hologram medium.

The step of masking may include masking an edge portion except for a center portion of a hogel printing area.

A size of the center portion may be determined based on a distribution of beams used for printing hogels.

The beams used for printing the hogels may be beams which are centrally collected and an intensity of which decreases toward edges.

The step of masking may include masking by using a mask which is disposed at a rear end of a spatial light modulator (SLM) for generating hogels.

The step of printing may include printing the masked hogel in close contact with an adjacent masked hogel.

The step of printing may include printing a portion of the masked hogel that is not covered by the mask on the hologram medium.

According to another embodiment of the present disclosure, a hologram printing apparatus includes: a fringe pattern generator configured to generate a hologram fringe pattern, and to split the hologram fringe pattern on a hogel basis; a hogel generator configured to generate the split hogels; a masking unit configured to mask a part of the generated hogel; and a printing unit configured to print the masked hogel on a hologram medium.

Advantageous Effects

According to embodiments of the present disclosure as described above, an empty space which occurs between hogels when a hologram is printed is prevented from being generated by using a mask, so that a fill factor can be effectively enhanced, and eventually, image quality of a hologram can be enhanced.

BEST MODE

Hereinafter, the present disclosure will be described in more detail with reference to the drawings.

Embodiments of the present disclosure provide a method and an apparatus for printing a hologram by using a mask.

In a related-art hologram printing method, an empty space may occur between hogels for a hardware reason even if a gap between the hogles is made narrow, and thus a fill factor may be degraded. In embodiments of the present disclosure, an empty space between hogels can be reduced by using a mask.

Figure 1:
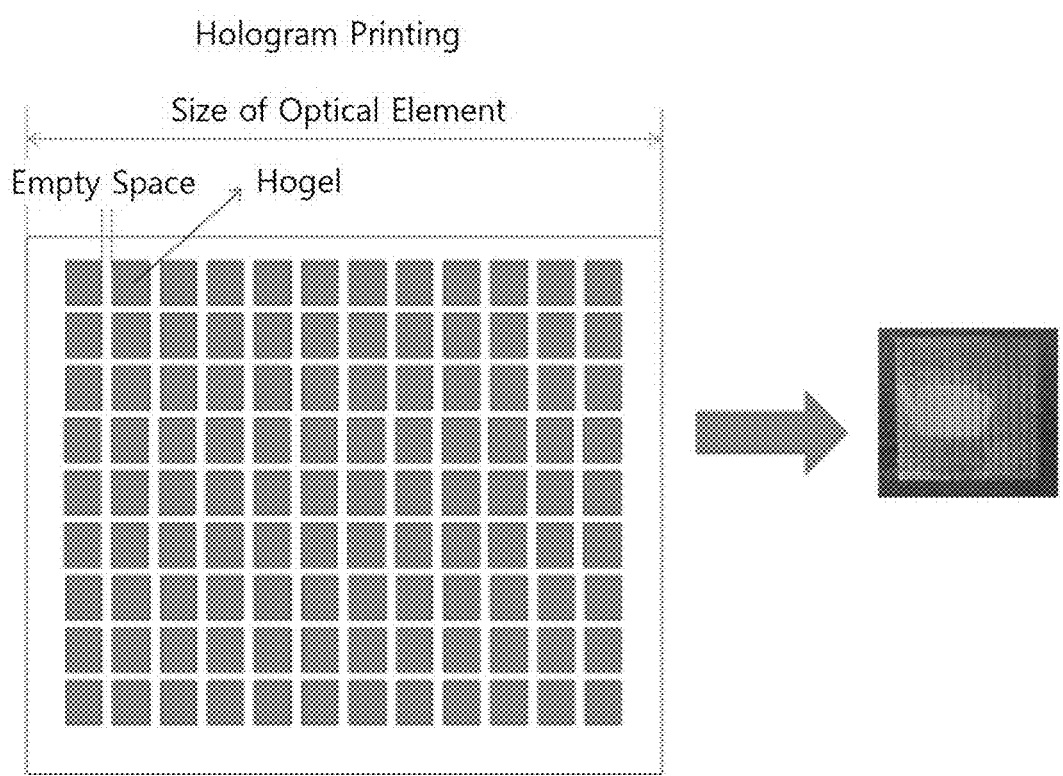
FIG. 1 is a view illustrating a hologram printing empty space.
Figure 2:
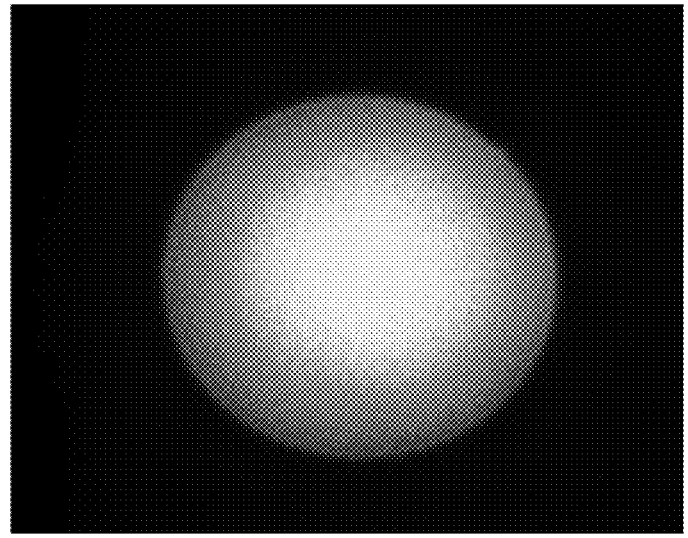
FIG. 2 is a view illustrating a field of Gaussian beams.
Figure 3:
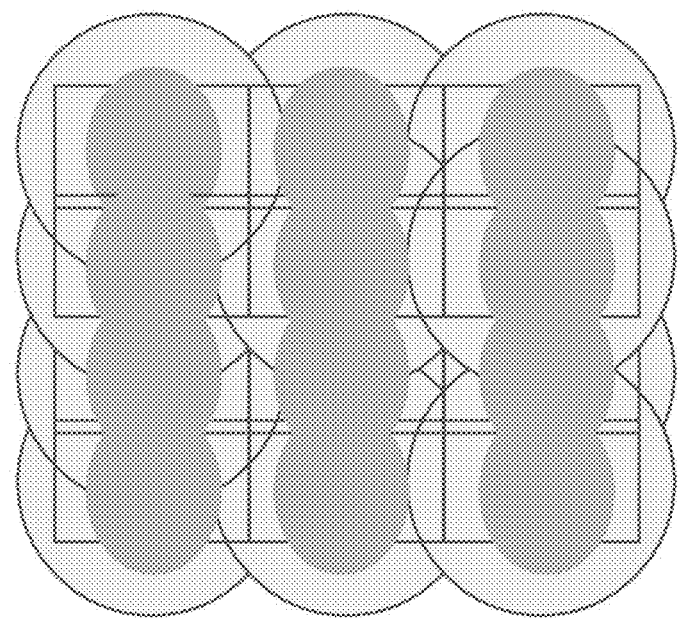
FIG. 3 is a view illustrating a result of printing by using Gaussian beams.

FIG. 2 illustrates a field of Gaussian beams, and FIG. 3 schematically illustrates a result of printing by using Gaussian beams.

As shown in FIG. 2, the Gaussian beams have a field in which light is centrally collected and an intensity of light decreases toward edges. Accordingly, if hogels are printed on a hologram medium with the Gaussian beams, an empty space occurs between the hogels as shown in FIG. 3.

Figure 4:
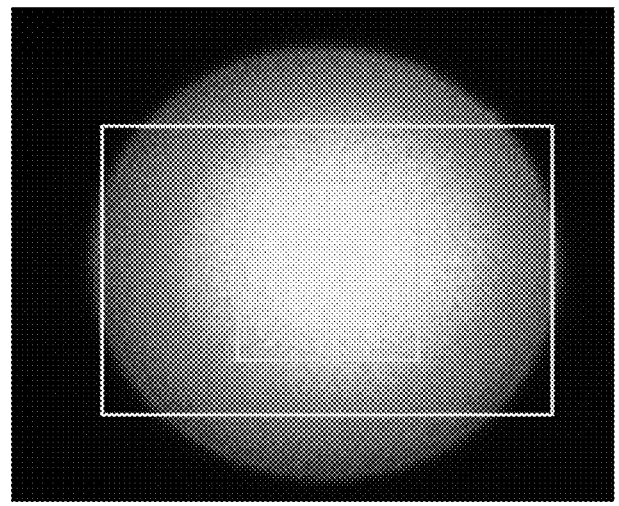
FIGS. 4 and 5 are views provided to explain a concept of masking to be used in a method and an apparatus for printing a hologram according to an embodiment of the present disclosure.
Figure 5:
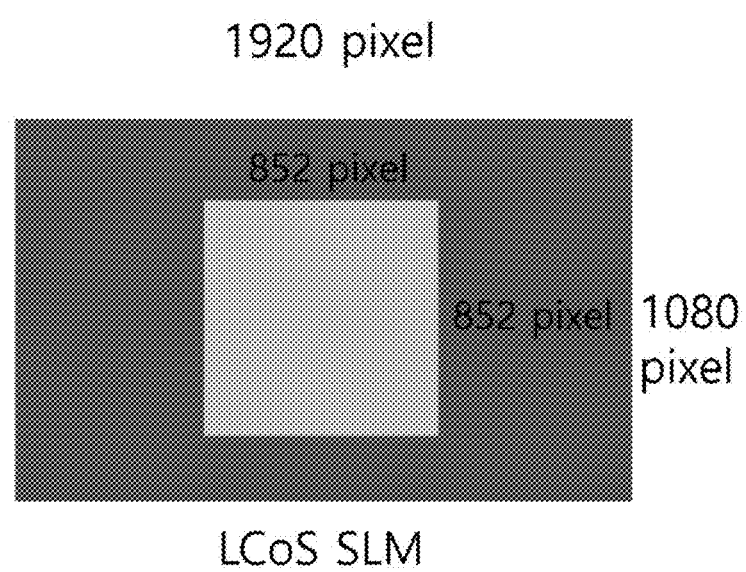

FIGS. 4 and 5 are views provided to explain a concept of masking to be used in a method and an apparatus for printing a hologram according to an embodiment of the present disclosure. Masking which is considered in embodiments of the present disclosure calculates an area in which light is collected in the Gaussian beams as shown in the drawing, and utilizes a mask that activates only the calculated area at a rear end of a spatial light modulator (SLM) (that is, a front surface of a flat surface of the SLM) as shown in FIG. 5. Accordingly, efficiency of the Gaussian beams is maximized and the empty space between the hogels is removed.

Figure 6:
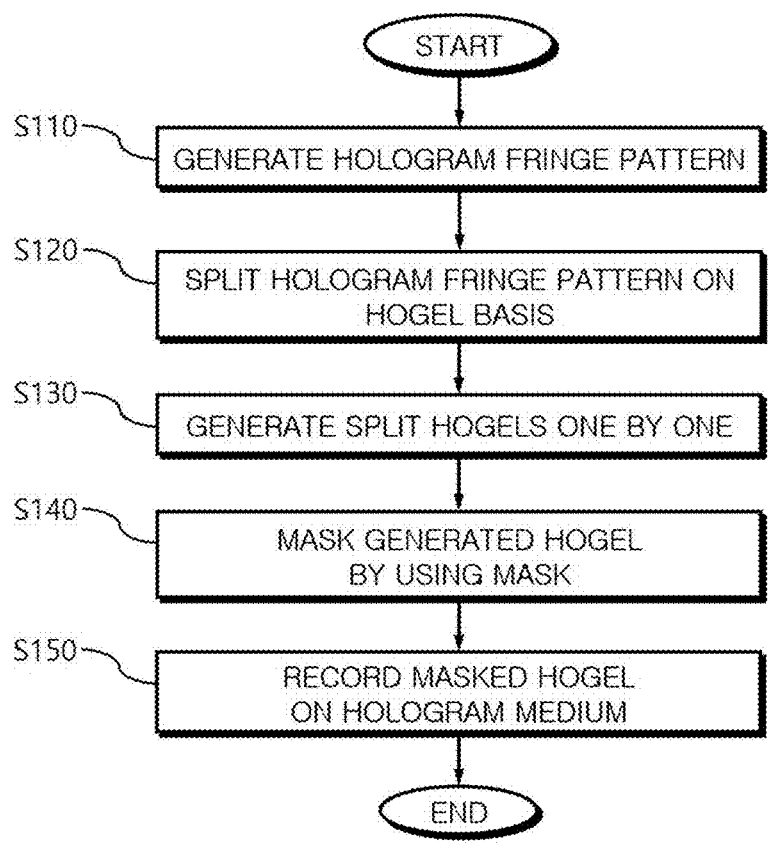
FIG. 6 is a flowchart provided to explain a hologram printing method according to an embodiment of the present disclosure.

FIG. 6 is a flowchart provided to explain a hologram printing method according to an embodiment of the present disclosure.

A hologram fringe pattern containing hologram information to be restored is generated to print a hologram (S110). The hologram fringe pattern generated at step S110 is split on a hogel basis (S120).

The hogels split at step S120 are generated in a light modulator such as an SLM one by one (S130). The hogels generated at step S130 are masked by using a mask positioned at a rear end of the SLM (S140).

Specifically, at step S140, an edge area except for a center area of the hogel is masked. A size of the center area that is not masked is determined based on a distribution of beams which are used for printing hogels on a hologram medium. As described above, the beams used for printing hogels are Gaussian beams which are centrally collected and the intensity of which decreases toward edges.

Thereafter, the hogels masked at step S140 are printed on a hologram medium (S150). Since the hogels are masked at step S140, only the center area that is not covered by the mask is printed on the hologram medium at step S150, and the edge area covered by the mask is not printed.

Thereafter, steps S130 to S150 are repeated until all hogels of the hologram fringe pattern are completely printed. When a masked hogel is printed at step S150, the masked hogel is printed in close contact with an adjacent masked hogel.

This is to prevent an empty space from occurring in the hologram medium. Accordingly, a size of the hogel printed at step S150 is smaller than the size of the hogel generated at step S130.

More specifically, the hogel printed at step S150 is the center area of the hogel generated at step S130.

Figure 7:
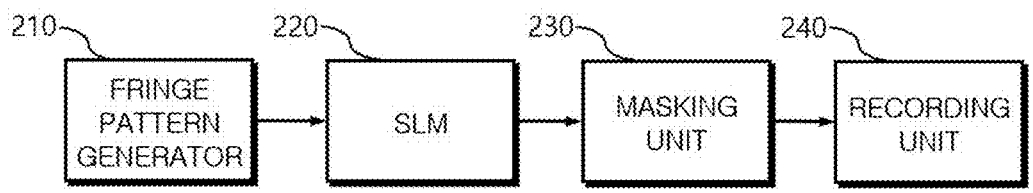
FIG. 7 is a block diagram provided to explain a hologram printing apparatus according to another embodiment of the present disclosure.

FIG. 7 is a block diagram provided to explain a hologram printing apparatus according to another embodiment of the present disclosure. The hologram printing apparatus according to an embodiment of the present disclosure may include a fringe pattern generator 210, a spatial light modulator (SLM) 220, a masking unit 230, and a printing unit 240 as shown in the drawing.

The fringe pattern generator 210 is a computing device that generates a hologram fringe pattern containing hologram information to be restored, and splits the generated hologram fringe pattern on a hogel basis.

The SLM 220 generates hogels split at the fringe pattern generator 210 one by one in sequence. The masking unit 230 masks an edge area except for a center area of the hogel generated by the SLM 220 at a rear end of the SLM 220.

The printing unit 240 prints the hogel masked by the SLM 220 on a hologram medium. The masked hogel is printed in close contact with adjacent hogels that have been already printed, thereby preventing an empty space from occurring, and simultaneously, enhancing a resolution.

Figure 8A:
FIG. 8 is a view illustrating results of hologram printing according to a related-art method and the method according to an embodiment of the present disclosure.
Figure 8B:
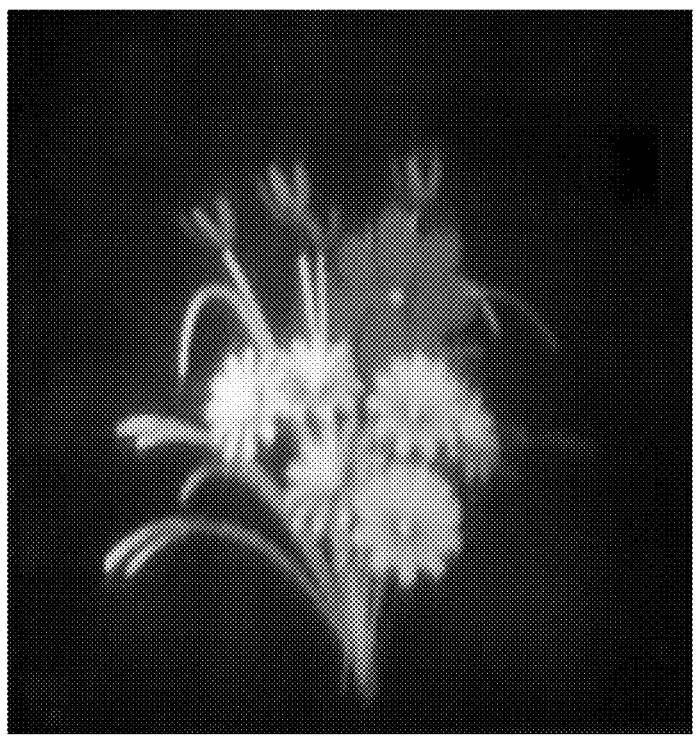

FIG. 8 illustrates results of printing a hologram according to a related-art method and the method according to an embodiment of the present disclosure.

The result of printing in the related-art method has a defect between hologram images and shows degraded quality as shown in (a) of FIG. 8. However, the result of printing in the method according to an embodiment of the present disclosure has no defect and represents a softened hologram image as shown in (b) of FIG. 8.

Up to now, the method and the apparatus for printing the hologram by using the mask have been described in detail with reference to preferred embodiments.

In order to reduce an empty space between hogels, which occurs in a related-art printing method, embodiments of the present disclosure prevent an empty space from occurring between hogels in advance by using a mask, thereby increasing a fill factor effectively, and eventually, enhancing image quality of a hologram.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A hologram printing method comprising:
generating a hologram fringe pattern;
splitting the hologram fringe pattern on a hogel basis;
generating the split hogels using a light modulator including a spatial light modulator (SLM);
masking a part of the generated hogel based on a result of using the light modulator after the light modulator is applied, wherein the masking comprises masking an edge portion except for a center portion of a hogel printing area; and
printing the masked hogel on a hologram medium, using beams which are centrally collected and an intensity of which decreases toward edges.

2. The method of claim 1, wherein a size of the center portion is determined based on a distribution of beams used for printing hogels.

3. The method of claim 1, wherein the masking comprises masking by using a mask which is disposed at a rear end of a spatial light modulator (SLM) for generating hogels.

4. The method of claim 1, wherein the printing comprises printing the masked hogel in close contact with an adjacent masked hogel.

5. The method of claim 1, wherein the printing comprises printing a portion of the masked hogel that is not covered by the mask on the hologram medium.

6. A hologram printing apparatus comprising:

a processor configured to:

generate a hologram fringe pattern, and split the hologram fringe pattern on a hogel basis;

generate the split hogels using a light modulator including a spatial light modulator (SLM);

mask a part of the generated hogel based on a result of using the light modulator after the light modulator is applied, wherein, for the masking, the processor is configured to mask an edge portion except for a center portion of a hogel printing area; and print the masked hogel on a hologram medium, using beams which are centrally collected and an intensity of which decreases toward edges.

7. The apparatus of claim 6, wherein a size of the center portion is determined based on a distribution of beams used for printing hogels.

8. The apparatus of claim 7, wherein the beams used for printing the hogels are beams which are centrally collected and an intensity of which decreases toward edges.

9. The apparatus of claim 6, wherein, for the masking, the processor is configured to mask by using a mask which is disposed at a rear end of a spatial light modulator (SLM) for generating hogels.

10. The apparatus of claim 6, wherein, for the printing, the processor is configured to print the masked hogel in close contact with an adjacent masked hogel.

11. The apparatus of claim 6, wherein, for the printing, the processor is configured to print a portion of the masked hogel that is not covered by the mask on the hologram medium.

* * * * *